US012565219B2

(12) United States Patent
Yokoyama et al.

(10) Patent No.: US 12,565,219 B2
(45) Date of Patent: Mar. 3, 2026

(54) DRIVING ASSISTANCE SYSTEM, IN-VEHICLE CONTROL DEVICE, DRIVING ASSISTANCE METHOD AND COMPUTER READABLE MEDIUM

(71) Applicant: Mitsubishi Electric Corporation, Tokyo (JP)

(72) Inventors: Tatsuya Yokoyama, Tokyo (JP); Takahisa Yamauchi, Tokyo (JP); Yoshitsugu Kawamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 160 days.

(21) Appl. No.: 18/517,523

(22) Filed: Nov. 22, 2023

(65) Prior Publication Data
US 2024/0083446 A1    Mar. 14, 2024

Related U.S. Application Data

(63) Continuation of application No. PCT/JP2021/025872, filed on Jul. 8, 2021.

(51) Int. Cl.
*B60W 50/00*      (2006.01)
*B60W 40/06*      (2012.01)
*B60W 40/09*      (2012.01)

(52) U.S. Cl.
CPC ........ *B60W 50/0098* (2013.01); *B60W 40/06* (2013.01); *B60W 40/09* (2013.01);
(Continued)

(58) Field of Classification Search
CPC ....... B60W 2520/10; B60W 2540/043; B60W 2540/30; B60W 2556/10; B60W 40/06;
(Continued)

(56) References Cited

U.S. PATENT DOCUMENTS

2017/0103121 A1    4/2017  Mori et al.
2017/0369052 A1*  12/2017  Nagy ..................... B60W 40/09
(Continued)

FOREIGN PATENT DOCUMENTS

DE    10 2019 215 308 A1    4/2021
DE    10 2019 215 816 A1    4/2021
(Continued)

OTHER PUBLICATIONS

German Office Action for German Application No. 11 2021 007 616.7, dated Mar. 13, 2024, with English translation.
(Continued)

*Primary Examiner* — Wade Miles
*Assistant Examiner* — Zachary Joseph Wallace
(74) *Attorney, Agent, or Firm* — Birch, Stewart, Kolasch & Birch, LLP

(57) ABSTRACT

A database creation unit (154) accumulates, in a driving condition database (160), driving condition data wherein feature amounts representing features of driving operation, travelling environment information including travelling spots and road shapes, driver information including attributes of drivers and vehicle type information of vehicles, and whether the drivers have driving experiences of the vehicles are associated with driver identifiers. A driving characteristic estimation unit (155) estimates a driving characteristic of a driver presently driving a vehicle based on the driving condition database (160). The database creation unit (154) determines whether a target driver has a driving experience of a target vehicle based on the driving condition database (160), determines whether the driving experience of the target vehicle by the target driver is changed, and when it is determined to be changed, updates the driving experience of the target vehicle by the target driver in the driving condition database (160).

11 Claims, 10 Drawing Sheets

(52) U.S. Cl.
    CPC .............. *B60W 2050/0088* (2013.01); *B60W 2540/043* (2020.02); *B60W 2556/10* (2020.02)

(58) Field of Classification Search
    CPC .. B60W 40/08; B60W 40/09; B60W 50/0098; B60W 2050/0088; G08G 1/00
    See application file for complete search history.

(56)                    References Cited

U.S. PATENT DOCUMENTS

| | | | |
|---|---|---|---|
| 2020/0098202 A1 | 3/2020 | Egami et al. | |
| 2021/0339755 A1 | 11/2021 | Inagaki et al. | |
| 2024/0083441 A1* | 3/2024 | Fujii ...................... | G09B 9/042 |

FOREIGN PATENT DOCUMENTS

| | | |
|---|---|---|
| JP | 2013-112324 A | 6/2013 |
| JP | 2013-122653 A | 6/2013 |
| JP | 2015-170126 A | 9/2015 |
| JP | 5821580 B2 | 11/2015 |
| JP | 2017-71333 A | 4/2017 |
| JP | 2018-97457 A | 6/2018 |
| JP | 2018-167648 A | 11/2018 |
| JP | 2019-16238 A | 1/2019 |
| JP | 2019-96107 A | 6/2019 |
| JP | 2019-96186 A | 6/2019 |
| JP | 2019-128849 A | 8/2019 |
| JP | 2019-207544 A | 12/2019 |
| JP | 2020-47072 A | 3/2020 |
| JP | 2020-183152 A | 11/2020 |

OTHER PUBLICATIONS

International Search Report, issued in PCT/JP2021/025872, PCT/ISA/210, dated Oct. 5, 2021.

* cited by examiner

Fig. 3

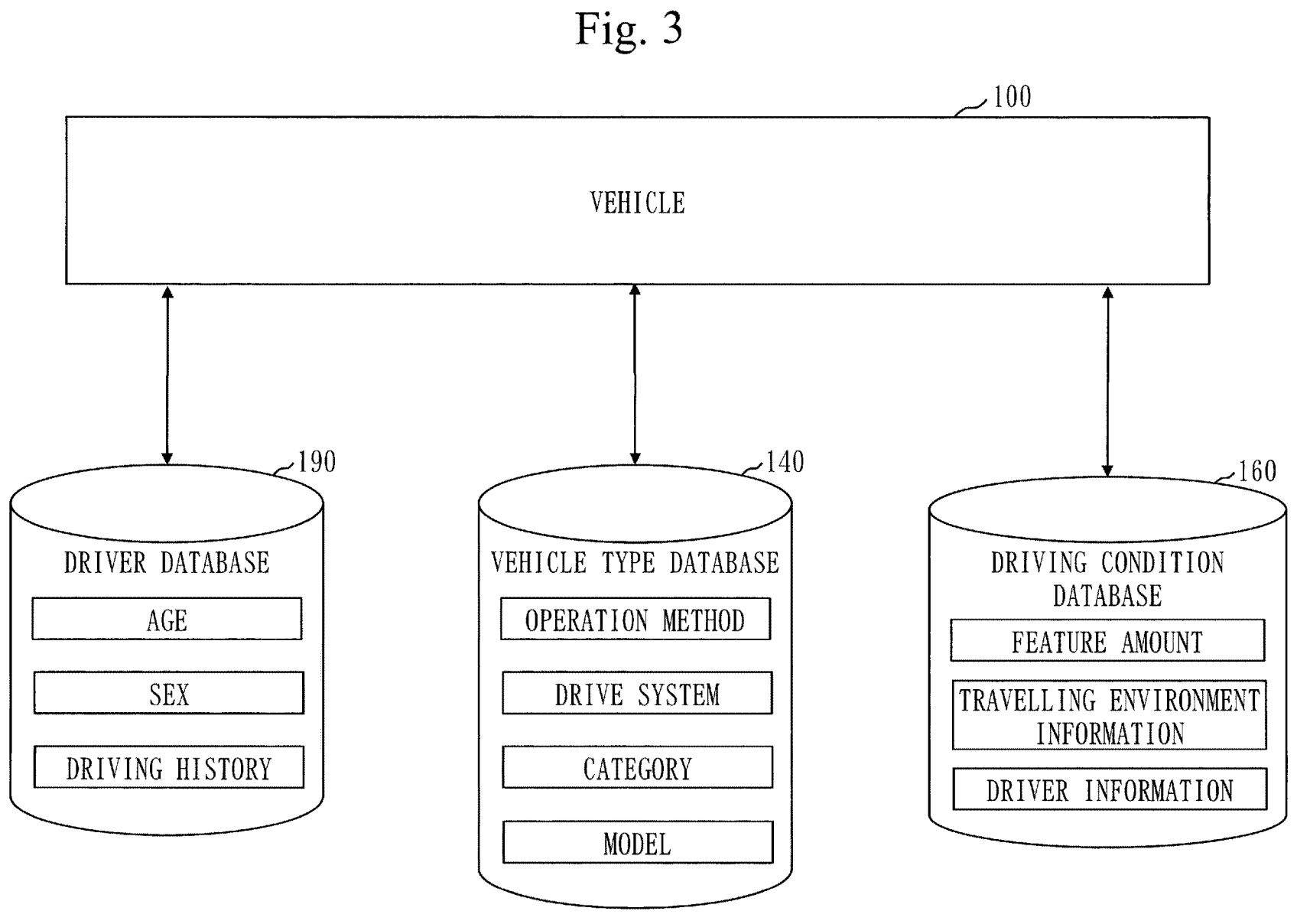

VEHICLE

100

DRIVING CONDITION DATABASE

160

FEATURE AMOUNT

TRAVELLING ENVIRONMENT INFORMATION

DRIVER INFORMATION

VEHICLE TYPE DATABASE

140

OPERATION METHOD

DRIVE SYSTEM

CATEGORY

MODEL

DRIVER DATABASE

190

AGE

SEX

DRIVING HISTORY

Fig. 4

160:DRIVING CONDITION DATABASE

VEHICLE TYPE A

| ROAD SHAPE | IDENTIFIER | TRAVELLING SPOT | | FEATURE AMOUNT | | | DRIVER INFORMATION | | | DRIVING EXPERIENCE FLAG |
|---|---|---|---|---|---|---|---|---|---|---|
| | | LONGITUDE | LATITUDE | ITEM 1 | ITEM 2 | ⋮ | ITEM 1 | ITEM 2 | ⋮ | |
| STRAIGHT ADVANCE | DRIVER 1 | LONGITUDE | LATITUDE | ITEM 1 | ITEM 2 | ⋮ | ITEM 1 | ITEM 2 | ⋮ | 1 |
| STRAIGHT ADVANCE | DRIVER 2 | LONGITUDE | LATITUDE | ITEM 1 | ITEM 2 | ⋮ | ITEM 1 | ITEM 2 | ⋮ | 0 |
| STRAIGHT ADVANCE | DRIVER 3 | LONGITUDE | LATITUDE | ITEM 1 | ITEM 2 | ⋮ | ITEM 1 | ITEM 2 | ⋮ | 1 |
| ⋮ | ⋮ | ⋮ | | | | | ⋮ | ⋮ | | ⋮ |
| CURVE | DRIVER 1 | LONGITUDE | LATITUDE | ITEM 1 | ITEM 2 | ⋮ | ITEM 1 | ITEM 2 | ⋮ | 1 |
| ⋮ | ⋮ | ⋮ | | ⋮ | | | ⋮ | | | ⋮ |
| INTERSECTION | DRIVER 1 | LONGITUDE | LATITUDE | ITEM 1 | ITEM 2 | ⋮ | ITEM 1 | ITEM 2 | ⋮ | 0 |
| ⋮ | ⋮ | ⋮ | | ⋮ | | | ⋮ | | | ⋮ |

Fig. 8

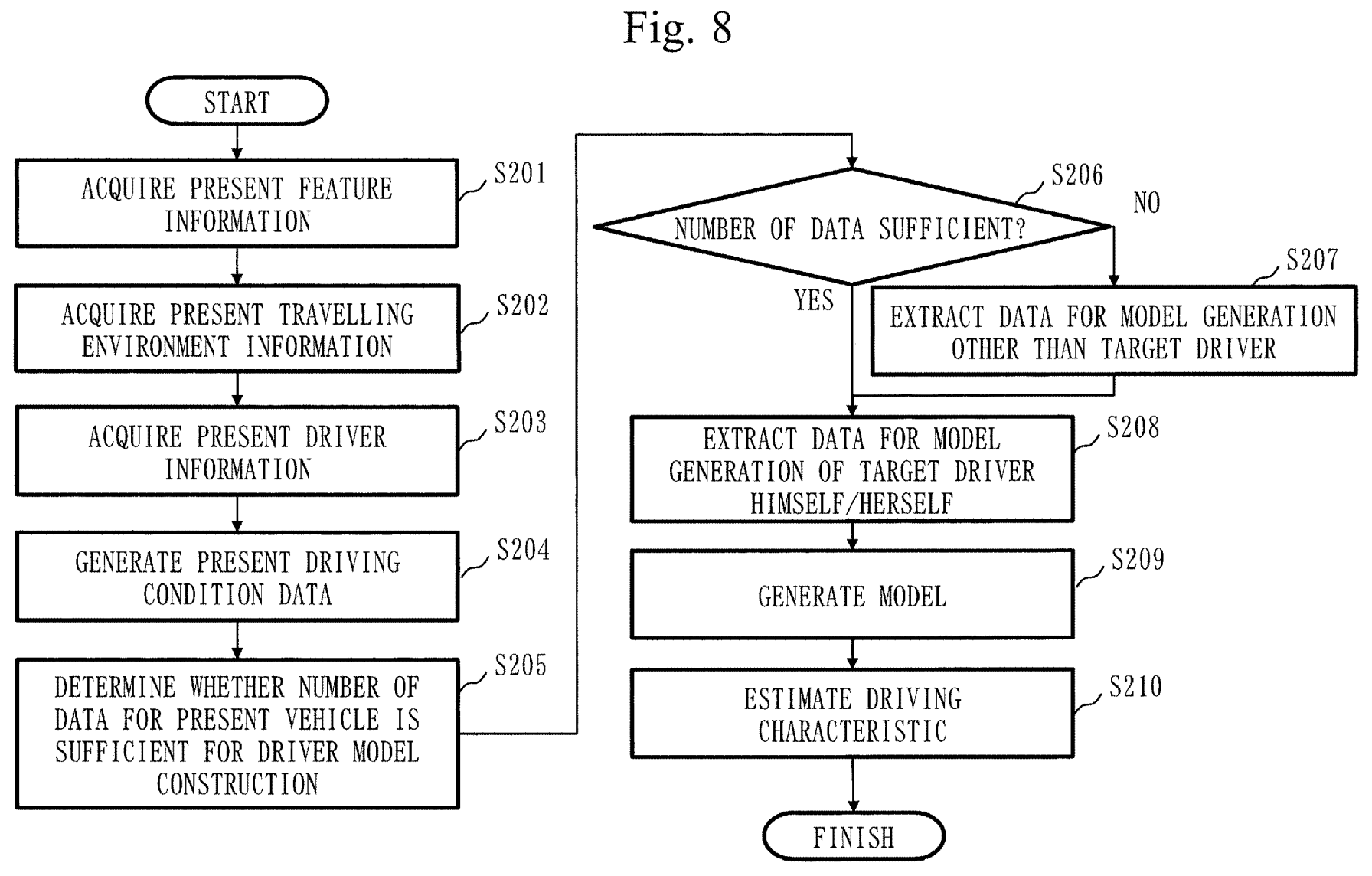

START

S201 — ACQUIRE PRESENT FEATURE INFORMATION

S202 — ACQUIRE PRESENT TRAVELLING ENVIRONMENT INFORMATION

S203 — ACQUIRE PRESENT DRIVER INFORMATION

S204 — GENERATE PRESENT DRIVING CONDITION DATA

S205 — DETERMINE WHETHER NUMBER OF DATA FOR PRESENT VEHICLE IS SUFFICIENT FOR DRIVER MODEL CONSTRUCTION

S206 — NUMBER OF DATA SUFFICIENT?

NO

S207 — EXTRACT DATA FOR MODEL GENERATION OTHER THAN TARGET DRIVER

YES

S208 — EXTRACT DATA FOR MODEL GENERATION OF TARGET DRIVER HIMSELF/HERSELF

S209 — GENERATE MODEL

S210 — ESTIMATE DRIVING CHARACTERISTIC

FINISH

1

DRIVING ASSISTANCE SYSTEM, IN-VEHICLE CONTROL DEVICE, DRIVING ASSISTANCE METHOD AND COMPUTER READABLE MEDIUM

CROSS REFERENCE TO RELATED APPLICATIONS

This application is a Continuation of PCT International Application No. PCT/JP2021/025872 filed on Jul. 8, 2021, which is hereby expressly incorporated by reference into the present application.

TECHNICAL FIELD

The present disclosure relates to a driving assistance system, an in-vehicle control device, a driving assistance method and a driving assistance program.

BACKGROUND ART

There exists a technique to associate a feature amount of driving operation by a driver with information related to a vehicle type whereon the driving operation has been performed. This technique is examined as an underlying technology of automatic driving or driving assistance.

Patent Literature 1 is aimed at appropriately determining driving operation according to a driving characteristic of a driver. In Patent Literature 1, an acceleration rate according to a step-in way of an accelerator and a brake is measured, a determination range of the step-in way is decided, and whether the step-in way is within the range is determined. In this case, it is disclosed that suitable determination of driving operation can be performed by combining identification information of the driver and a vehicle type, even when the same driver drives different vehicles.

CITATION LIST

Patent Literature

Patent Literature 1: JP 2020-047072 A

SUMMARY OF INVENTION

Problem to be Solved by the Invention

In the technique of Patent Literature 1, a feature amount of driving operation of a driver is associated with information related to a vehicle type whereon the driving operation is performed. However, in the technique of Patent Literature 1, it is impossible to update a database when a driving experience of the driver changes, and to provide a service suitable for an individual. Further, since personal data is regarded as a target, when information related to a specific vehicle type is lacking in a database, it is impossible to provide a service suitable for individuals.

The present disclosure is aimed at receiving suitable driving assistance corresponding to an individual driver even in a situation wherein the driver drives a vehicle type which the driver is inexperienced in driving, and in a case wherein a driving experience of the driver is changed.

Means to Solve the Problem

There is provided according to one aspect of the present disclosure a driving assistance system includes:

a driving condition database to store driving condition data wherein a feature amount representing a feature of a driving operation by a driver driving a vehicle, travelling environment information including a travelling spot and a road shape where the vehicle driven by the driver travels, driver information including an attribute of the driver and vehicle type information of the vehicle, and presence or absence of a driving experience of the vehicle by the driver, are associated with a driver identifier to identify the driver;

a driving characteristic estimation unit to estimate a driving characteristic of a driver driving a vehicle at present based on the driving condition database; and a database creation unit to determine presence or absence of a driving experience of a target vehicle by a target driver based on the driving condition database where the driver to be estimated the driving characteristic is regarded as the target driver, and the vehicle driven by the target driver at present is regarded as the target vehicle, to determine whether the driving experience of the target vehicle by the target driver has been changed by referring to the driving condition database, and when it is determined to have been changed, to update the driving experience of the target vehicle by the target driver in the driving condition database.

Effects of the Invention

A driving assistance system according to the present disclosure provides an effect that it is possible to receive suitable driving assistance corresponding to an individual driver even in a situation wherein the driver drives a vehicle which the driver is inexperienced in driving, and in a case wherein a driving experience of the driver changes.

BRIEF DESCRIPTION OF DRAWINGS

FIG. 3 is a diagram illustrating a configuration example in each database outside the vehicle of the driving assistance system according to the first embodiment;

FIG. 4 is a diagram illustrating an example of table of a driving condition database according to the first embodiment;

FIG. 8 is a flowchart illustrating an example of a processing procedure of a driving characteristic estimation unit according to the first embodiment;

DESCRIPTION OF EMBODIMENT

Hereinafter, description will be made on the present embodiment using diagrams. In drawings, the same or the corresponding elements are denoted by the same reference signs. In description of the embodiment, explanation of the same or the corresponding elements is appropriately omitted or simplified.

First Embodiment

*Description of Configuration*

Figure 1:
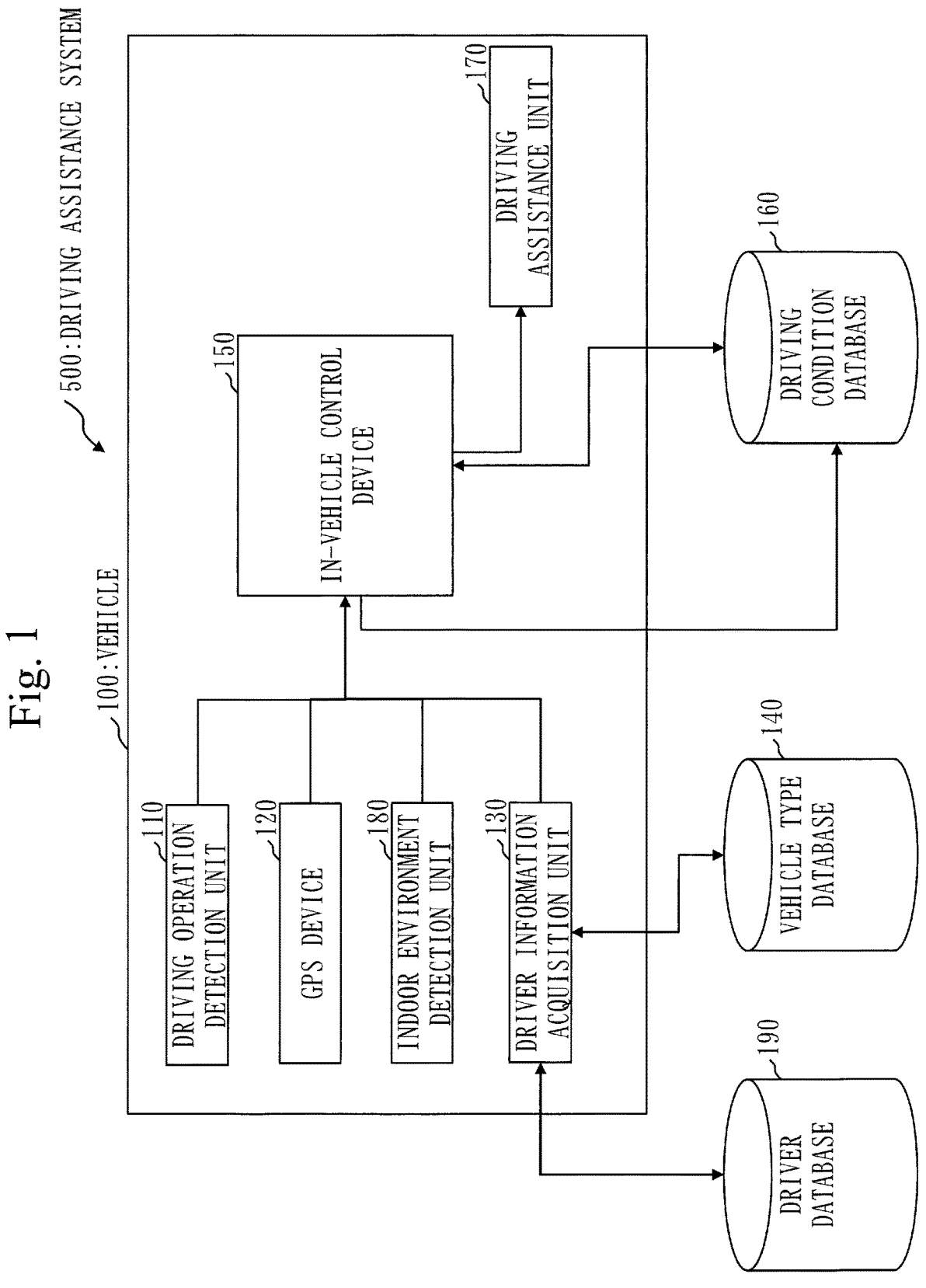
FIG. 1 is a diagram illustrating an example of an overall configuration of a driving assistance system according to a first embodiment.

FIG. 1 is a diagram illustrating an example of an overall configuration of a driving assistance system 500 according to the present embodiment.

Figure 2:
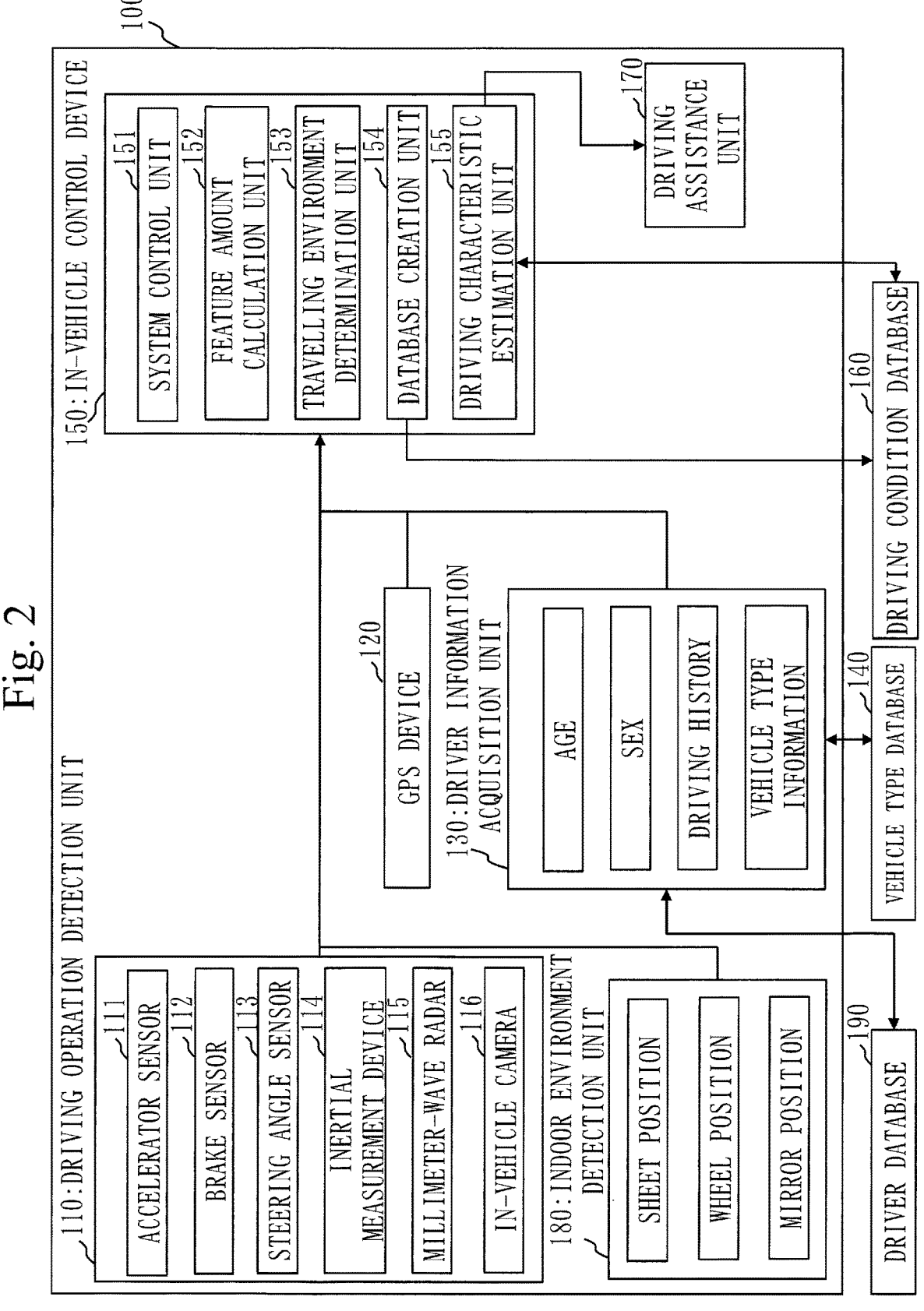
FIG. 2 is a diagram illustrating an example of a functional configuration in a vehicle of the driving assistance system according to the first embodiment.

FIG. 2 is a diagram illustrating an example of a functional configuration in a vehicle 100 of the driving assistance system 500 according to the present embodiment.

FIG. 3 is a diagram illustrating a configuration example in each database outside the vehicle 100 of the driving assistance system 500 according to the present embodiment.

Description will be made on an example of an overall functional configuration of the driving assistance system 500 using FIG. 1 through FIG. 3.

The driving assistance system 500 is a system to estimate and utilize for driving assistance a driving characteristic of a driver to perform driving operation of the vehicle 100. The driving assistance system 500 includes the vehicle 100, a vehicle type database 140, a driving condition database 160 and a driver database 190.

The vehicle type database 140, the driving condition database 160 and the driver database 190 are provided outside the vehicle 100.

The vehicle 100 is a main body of a vehicle whereto driving assistance is applied.

The vehicle 100 includes a driving operation detection unit 110, a GPS (Global Positioning System) device 120, a driver information acquisition unit 130, an in-vehicle control device 150, a driving assistance unit 170 and an indoor environment detection unit 180.

<Driving Operation Detection Unit 110>

The driving operation detection unit 110 is a driving operation detection measure to detect an operation state of various types of driving operation provided in the vehicle 100.

The driving operation detection unit 110 includes an accelerator sensor 111, a brake sensor 112, a steering angle sensor 113, an inertial measurement device 114, a millimeter-wave radar 115 and an in-vehicle camera 116.

The accelerator sensor 111 detects a step-in amount of an accelerator pedal by a driver of the vehicle 100, and outputs the detection result to the in-vehicle control device 150.

The brake sensor 112 detects a step-in amount of a brake pedal by the driver of the vehicle 100, and outputs the detection result to the in-vehicle control device 150.

The steering angle sensor 113 detects an operation angle of a steering by the driver of the vehicle 100, and outputs the detection result to the in-vehicle control device 150.

The inertial measurement device 114 includes a triaxial acceleration sensor and a triaxial angular velocity sensor. The inertial measurement device 114 detects a triaxial acceleration and triaxial angular velocity generated in the vehicle 100 by operation of an accelerator pedal, a brake pedal and a steering by the driver of the vehicle 100, and outputs the detection result to the in-vehicle control device 150.

The millimeter-wave radar 115 detects an inter-vehicle distance, a relative speed and an angle with respect to the preceding vehicle travelling ahead in the travelling direction of the vehicle 100 using a radio wave in a millimeter wave band, and outputs the detection result to the in-vehicle control device 150.

The in-vehicle camera 116 takes an image of a peripheral environment of the vehicle 100, and outputs the image to the in-vehicle control device 150.

<GPS Device 120>

The GPS device 120 detects an absolute position, i.e., latitude and longitude of the vehicle 100, and outputs the detection result to the in-vehicle control device 150.

<Driver Information Acquisition Unit 130>

The driver information acquisition unit 130 acquires driver information including an attribute of the driver of the vehicle 100 and vehicle type information of the vehicle 100. The driver information includes age, sex, and a driving history of the vehicle 100 of the driver, as the attribute of the driver. Further, the driver information includes vehicle type information of the vehicle 100. The driver information acquisition unit 130 acquires age, sex, and the driving history of the vehicle 100 of the driver of the vehicle 100, and the vehicle type information of the vehicle 100 when the vehicle 100 is started, and outputs the driver information to the in-vehicle control device 150.

The driver information acquisition unit 130 acquires age, sex and the driving history of the vehicle 100 of the driver from data stored in the driver database 190 provided outside the vehicle 100. The driver information acquisition unit 130 acquires information corresponding to the driver of the vehicle 100 from the data stored in the driver database 190.

Further, the driver information acquisition unit 130 acquires information corresponding to the vehicle 100 such as an operation method, a drive system, a category, and a model stored in the vehicle type database 140 provided outside the vehicle 100, as the vehicle type information.

As the operation method, there are types such as manual transmission or automatic transmission, for example. As the drive system, there are types such as four-wheel drive, front-engine front-drive, front-engine rear-drive, mid-engine rear-drive, or rear-engine rear-drive, for example. As the category, there are types such as a light motor vehicle, a compact car, or an ordinary motor vehicle, for example.

<Vehicle Type Database 140>

The vehicle type database 140 is a database to store statistic information such as an operation method, a drive system, a category and a model, as the vehicle type information. The vehicle type database 140 outputs the vehicle type information corresponding to the vehicle 100 in response to an inquiry from the driver information acquisition unit 130.

<In-Vehicle Control Device 150>

The in-vehicle control device 150 includes a system control unit 151, a feature amount calculation unit 152, a travelling environment determination unit 153, a database creation unit 154 and a driving characteristic estimation unit 155.

Hereinafter, description will be made on each constituting unit of the in-vehicle control device 150.

<<System Control Unit 151>>

The system control unit 151 controls various in-vehicle apparatuses such as an engine, a brake, a turn lamp and a steering based on a detection result of each sensor input from the driving operation detection unit 110. The detection result of each sensor input from the driving operation detection unit 110 is data indicating the operation state of various types of driving operation by the driver of the vehicle 100. Each sensor indicates each of the accelerator sensor 111, the brake sensor 112, the steering angle sensor 113, the inertial measurement device 114, the millimeter-wave radar 115 and the in-vehicle camera 116.

<<Feature Amount Calculation Unit 152>>

The feature amount calculation unit 152 calculates a feature amount representing a feature of driving operation by the driver driving the vehicle 100. The feature amount calculation unit 152 calculates the feature amount of driving operation of the driver of the vehicle 100 based on the detection result of each sensor input from the driving operation detection unit 110, and outputs the feature amount to the database creation unit 154.

<<Travelling Environment Determination Unit 153>>

The travelling environment determination unit 153 determines a travelling spot and a road shape where the vehicle 100 travels, based on a detection result of an absolute position input from the GPS device 120. Then, the travelling environment determination unit 153 generates travelling environment information including the travelling spot and the road shape where the vehicle 100 driven by the driver travels, and outputs the travelling environment information to the database creation unit 154. The travelling spot is a spot indicated by latitude and longitude. As for the road shape travelled, the road shape such as straight advance, right or left turn, or curve is determined from the shape obtained by connecting the travelling spots acquired continuously by a straight line, for example.

<<Database Creation Unit 154>>

The database creation unit 154 acquires a feature amount of driving operation, travelling environment information, driver information of the vehicle 100 and indoor environment information, associates and registers in the driving condition database 160 provided outside the vehicle 100 these pieces of information.

The feature amount of driving operation is input by the feature amount calculation unit 152.

The travelling environment information is input from the travelling environment determination unit 153.

The driver information of the vehicle 100 is input from the driver information acquisition unit 130. The driver information of the vehicle 100 includes age, sex and driving history of the vehicle 100 of the driver of the vehicle 100, and the vehicle type information.

The indoor environment information is input from an indoor environment detection unit 180 described below. The indoor environment information is information to represent a setting state inside the vehicle 100 by the driver. The indoor environment information of the vehicle 100 includes sheet position, steering wheel position and mirror position.

In the driving operation of the driver, the feature amounts of driving operation tend to become common in common or similar travelling environments. Meanwhile, when the travelling environments are different, the feature amounts of driving operation tend to differ from one another. Therefore, the database creation unit 154 associates the feature amount of driving operation with a travelling spot and a road shape included in the travelling environment information.

Additionally, driving operations by a driver have a tendency to have common feature amounts of driving operation in common or similar travelling environments. Meanwhile, when the types of vehicles to perform driving operation differ from one another, the feature amounts of driving operation tend to differ from one another even when the travelling environments are common or similar. Therefore, the feature amounts of driving operation are associated with the driver information including age, sex and the driving history of the vehicle 100 of the driver of the vehicle 100, and the vehicle type information of the vehicle 100.

In the driving characteristic estimation unit 155, it is assumed that data is referred to from the driving condition database 160 for every combination of a driver and a vehicle type. Therefore, a unique identifier is assigned to each driver, and the identifier is attached to information registered in the driving condition database 160 described above. The identifier is what identifies the driver. The unique identifier for each driver is an identification number from a driver 1 to a driver N, for example.

Further, the database creation unit 154 refers to data registered by the driver himself/herself, whereof driver information and travelling environment information are common or similar, from the data stored in the driving condition database 160, and determines whether the driver has an experience to drive the vehicle 100. The database creation unit 154 determines presence or absence of driving experience based on the number of pieces of data which have been referred to, for example. To the information to be registered in the driving condition database 160 described above, information meaning presence of driving experience is attached when it is determined that the driver has the driving experience, and information meaning absence of driving experience is attached when it is determined that the driver does not have the driving experience. For example, information (hereinafter, a driving experience flag) indicating a value of 1 is attached in a case of presence of experience, and information indicating a value of 0 is attached in a case of absence of experience.

Meanwhile, among the data stored in the driving condition database 160 and the information to be registered in the driving condition database 160 described above, the driving experience flag described above is referred to and compared, and whether there is a change to presence or absence of experience of the driver to drive the vehicle 100 is determined. When it is determined that there exists a change to the driving experience, the information related to presence or absence of the driving experience attached to the data stored in the driving condition database 160 is updated. For example, when it is changed to presence of driving experience, the value 0 in the case of absence of experience is updated to the value 1 in the case of presence of experience, and when it is changed to absence of driving experience, the value 1 in the case of presence of experience is updated to the value 0 in the case of absence of experience.

<<Driving Characteristic Estimation Unit 155>>

The driving characteristic estimation unit 155 performs a processing to estimate driving characteristics of a driver presently driving the vehicle 100, based on the driving condition database 160. The driving characteristics are individual differences such as degrees and timings of acceleration/deceleration and steering, or a vehicular gap maintained with the vehicle ahead.

The driving characteristic estimation unit 155 acquires an acquisition result of a feature amount of driving operation, travelling environment information, and driver information of the driver of the vehicle 100, with respect to the driver of the vehicle 100 being a target of estimation. The driving characteristic estimation unit 155 refers to the driving condition database 160 by using the travelling environment information and the driver information of the vehicle 100 as extraction conditions. Specifically, the driving characteristic estimation unit 155 refers to common or similar data registered by the driver himself/herself, which is stored in the driving condition database 160 based on the extraction conditions. In this case, the driving characteristic estimation unit 155 determines whether the driver is the driver himself/herself using a unique identifier for each driver, given in the database creation unit 154.

The driving characteristic estimation unit 155 determines from the data referred to whether the number of pieces of data corresponding to the vehicle presently driven by the driver of the vehicle 100 being the target of estimation is sufficient for building a model of driving characteristic estimation. When it is determined to be sufficient, the driving characteristic estimation unit 155 builds an estimation model of driving characteristics using the data of the driver himself/herself of the vehicle 100. When it is determined to be insufficient, the driving characteristic estimation unit 155 refers to similar or common data registered by another driver among the data stored in the driving condition database 160, and builds an estimation model of driving characteristics using items of the feature amount in the data. The driving characteristic estimation unit 155 performs estimation of driving characteristics on the estimation model built using the feature amount of driving operation input from the feature amount calculation unit 152 as an input, and outputs the estimation result to the driving assistance unit 170.

<Driving Condition Database 160>

FIG. 4 is a diagram illustrating an example of a table of the driving condition database 160 according to the present embodiment.

The driving condition database 160 is a database provided outside the vehicle 100, which stores the feature amount of driving operation, the travelling environment information including a travelling spot and a road shape, the age, sex and driving history of the vehicle 100 of drivers of the vehicle 100, and the vehicle information of the vehicle 100, input from the database creation unit 154. Further, in the driving condition database 160, whether the driver has a driving experience of a vehicle is set by the driving experience flag. Further, the database creation unit 154 registers the indoor environment information input from the indoor environment detection unit 180 as driver information in the driving condition database 160.

The driving condition database 160 outputs data to be a target of the driving characteristic estimation process to the driving characteristic estimation unit 155 in response to an instruction from the driving characteristic estimation unit 155.

In FIG. 4, the vehicle type is determined from models included in the driver information, the table is divided for each vehicle type, and data is stored. To explain each item, "road shape" stores a determination result of a road shape input from the travelling environment determination unit 153. Further, "identifier" stores a unique identifier for each driver assigned in the database creation unit 154. Meanwhile, "spot (latitude and longitude)" stores a travelling spot (latitude and longitude) input from the travelling environment determination unit 153. Further, "feature amount" stores a calculation result of the feature amount of driving operation input from the feature amount calculation unit 152. Furthermore, "driver information" stores an acquisition result of the age, sex, and driving history of the vehicle 100 of the driver of the vehicle 100 input from the driver information acquisition unit 130, a detection result of the sheet positions, steering wheel position and mirror positions input form the indoor environment detection unit 180. Meanwhile, "driving experience flag" stores a driving experience flag given in the database creation unit 154.

<Driving Assistance Unit 170>

The driving assistance unit 170 performs driving assistance corresponding to the driving characteristic based on the estimation result of the driving characteristic input from the driving characteristic estimation unit 155. For example, in ACC (Adaptive Cruise Control), control to reproduce fluctuation in acceleration/deceleration operation of the driver is performed while keeping a vehicular gap frequently maintained by the driver at the same time. Further, in LKA (Lane Keeping Assist), the lateral position in a road frequently maintained by an individual is controlled. Meanwhile, when the driver has ridden the vehicle 100 for more than once, position adjustment of sheets, a steering wheel, a room mirror and side mirrors is performed at the time when the in-vehicle control device 150 receives an input from the driver information acquisition unit 130, by referring to the information of the sheet positions, the steering wheel position and the mirror positions set by the driver of the vehicle 100 from the database. Whether the driver has ridden the vehicle 100 for more than once is determined depending on whether the information related to the sheet positions, the steering wheel position and the mirror positions of the driver with respect to the vehicle 100 has been registered in the driving condition database 160.

<Indoor Environment Detection Unit 180>

The indoor environment detection unit 180 is an indoor environment detection unit to detect position information of indoor environment such as sheets, a steering wheel and minors provided to the vehicle 100, and to output the position information to the in-vehicle control device 150. As the information of the indoor environment, the sheet positions, the steering wheel position, and the mirror positions including the room mirror and the side minors set by the driver of the vehicle 100 are detected.

<Driver Database 190>

The driver database 190 is a database to store the age, sex, and driving history of the vehicle 100 of drivers provided outside the vehicle 100, which outputs information corresponding to a driver driving the vehicle 100 in response to an inquiry from the driver information acquisition unit 130.

Figure 5:
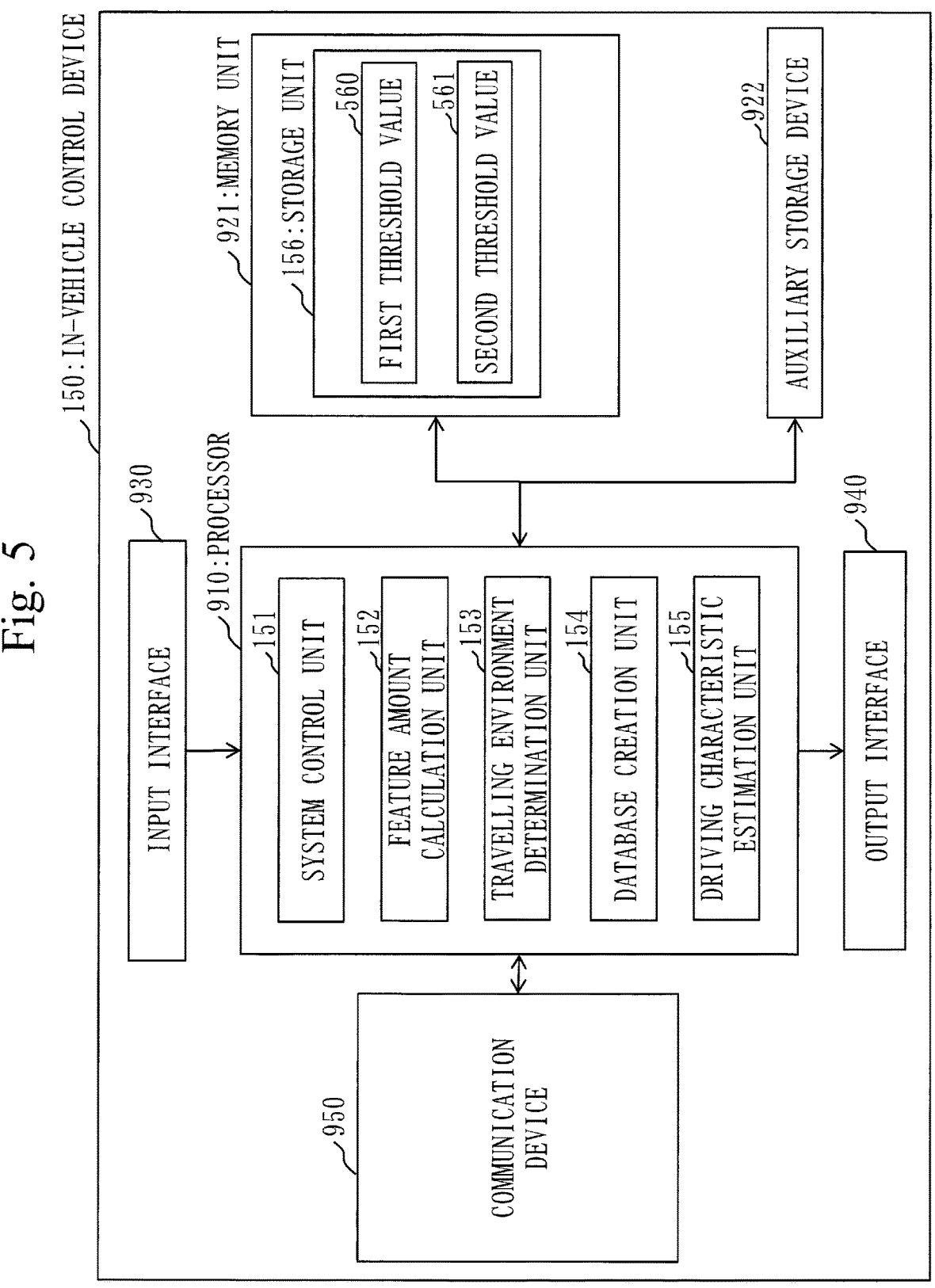
FIG. 5 is a diagram illustrating a configuration example of an in-vehicle control device according to the first embodiment.

FIG. 5 is a diagram to illustrate a configuration example of the in-vehicle control device 150 according to the present embodiment.

The in-vehicle control device 150 is a computer. The in-vehicle control device 150 includes a processor 910, and additionally includes other hardware components such as a memory unit 921, an auxiliary storage device 922, an input interface 930, an output interface 940 and a communication device 950. The processor 910 is connected to other hardware components via a signal line to control these other hardware components.

The in-vehicle control device 150 includes, as functional elements, the system control unit 151, the feature amount calculation unit 152, the travelling environment determination unit 153, the database creation unit 154, the driving characteristic estimation unit 155 and a storage unit 156. The storage unit 156 stores a first threshold value 560 and a second threshold value 561.

The functions of the system control unit 151, the feature amount calculation unit 152, the travelling environment determination unit 153, the database creation unit 154 and the driving characteristic estimation unit 155 are realized by software. The storage unit 156 is equipped in the memory unit 921. The storage unit 156 may be equipped in the auxiliary storage device 922, or may be equipped in the memory unit 921 and the auxiliary storage device 922 dispersively.

The processor 910 is a device to execute a driving assistance program. The driving assistance program is a program to realize functions of the system control unit 151, the feature amount calculation unit 152, the travelling environment determination unit 153, the database creation unit 154 and the driving characteristic estimation unit 155.

The processor 910 is an IC (Integrated Circuit) to perform arithmetic processing. The concrete example of the processor 910 is a CPU (Central Processing Unit), a DSP (Digital Signal Processor) and a GPU (Graphics Processing Unit).

The memory unit 921 is a storage device to temporarily store data. A concrete example of the memory unit 921 is an SRAM (Static Random Access Memory) or a DRAM (Dynamic Random Access Memory).

The auxiliary storage device 922 is a storage device to retain data. A concrete example of the auxiliary storage device 922 is an HDD. Further, the auxiliary storage device 922 may be a portable storage medium such as an SD (registered trademark) memory card, a CF, a NAND flash, a flexible disk, an optical disk, a compact disk, a Blue-ray (registered trademark) disk, or a DVD. HDD is an abbreviation for "hard disk drive". SD (registered trademark) is an abbreviation for "Secure Digital". CF is an abbreviation for "CompactFlash (registered trademark)". DVD is an abbreviation for "Digital Versatile Disk".

The input interface 930 is a port connected to an input device such as a mouse, a keyboard or a touch panel. The input interface 930 is a USB (Universal Serial Bus) terminal, for example. The input interface 930 may be a port connected to a LAN (Local Area Network).

The output interface 940 is a port whereto a cable of an output device such as a display is connected. The output interface 940 is, for example, a USB terminal or an HDMI (registered trademark) (High Definition Multimedia Interface) terminal. The display is, for example, an LCD (Liquid Crystal Display). The output interface 940 is also called an indicator interface.

The communication device 950 includes a receiver or a transmitter. The communication device 950 is connected to a communication network such as a LAN, the Internet or a telephone line. The communication device 950 is, for example, a communication chip or an NIC (Network Interface Card).

The driving assistance program is executed by the in-vehicle control device 150. The driving assistance program is read into the processor 910, and is executed by the processor 910. The memory unit 921 stores not only the driving assistance program but also an OS (Operating System). The processor 910 executes the driving assistance program while executing the OS. The driving assistance program and the OS may be stored in the auxiliary storage device 922. The driving assistance program and the OS stored in the auxiliary storage device 922 are loaded into the memory unit 921, and executed by the processor 910. A part or the whole of the driving assistance program may be incorporated in the OS.

The in-vehicle control device 150 may include a plurality of processors to replace the processor 910. The plurality of processors share execution of the driving assistance program. Each processor is a device to execute the driving assistance program as with the processor 910.

The data, information, signal values and variable values used, processed or output by the driving assistance program are stored in the memory unit 921, the auxiliary storage device 922 or a register or a cache memory device inside the processor 910.

"Unit" of each unit of the system control unit 151, the feature amount calculation unit 152, the travelling environment determination unit 153, the database creation unit 154 and the driving characteristic estimation unit 155 may be replaced with "circuit", "step", "procedure", "process" or "circuitry". The driving assistance program makes a computer execute the system control unit 151, the feature amount calculation unit 152, the travelling environment determination unit 153, the database creation unit 154 and the driving characteristic estimation unit 155. "Process" of a measurement process, a component extraction process, a feature amount extraction process, a registration process and a comparison process may be replaced with "program", "program product", "a computer-readable storage medium storing a program" or "computer-readable recording medium recording a program". Further, a driving assistance method is a method performed by executing the driving assistance program by the in-vehicle control device 150.

The driving assistance program may be provided by being stored in a computer-readable recording medium. Further, the driving assistance program may be provided as a program product.

\*\*\*Description of Operation\*\*\*

Next, description will be made on an operation of the in-vehicle control device 150 according to the present embodiment. The operation procedure of the in-vehicle control device 150 corresponds to the driving assistance method. Further, a program to realize the operation of the in-vehicle control device 150 corresponds to the driving assistance program.

Figure 6:
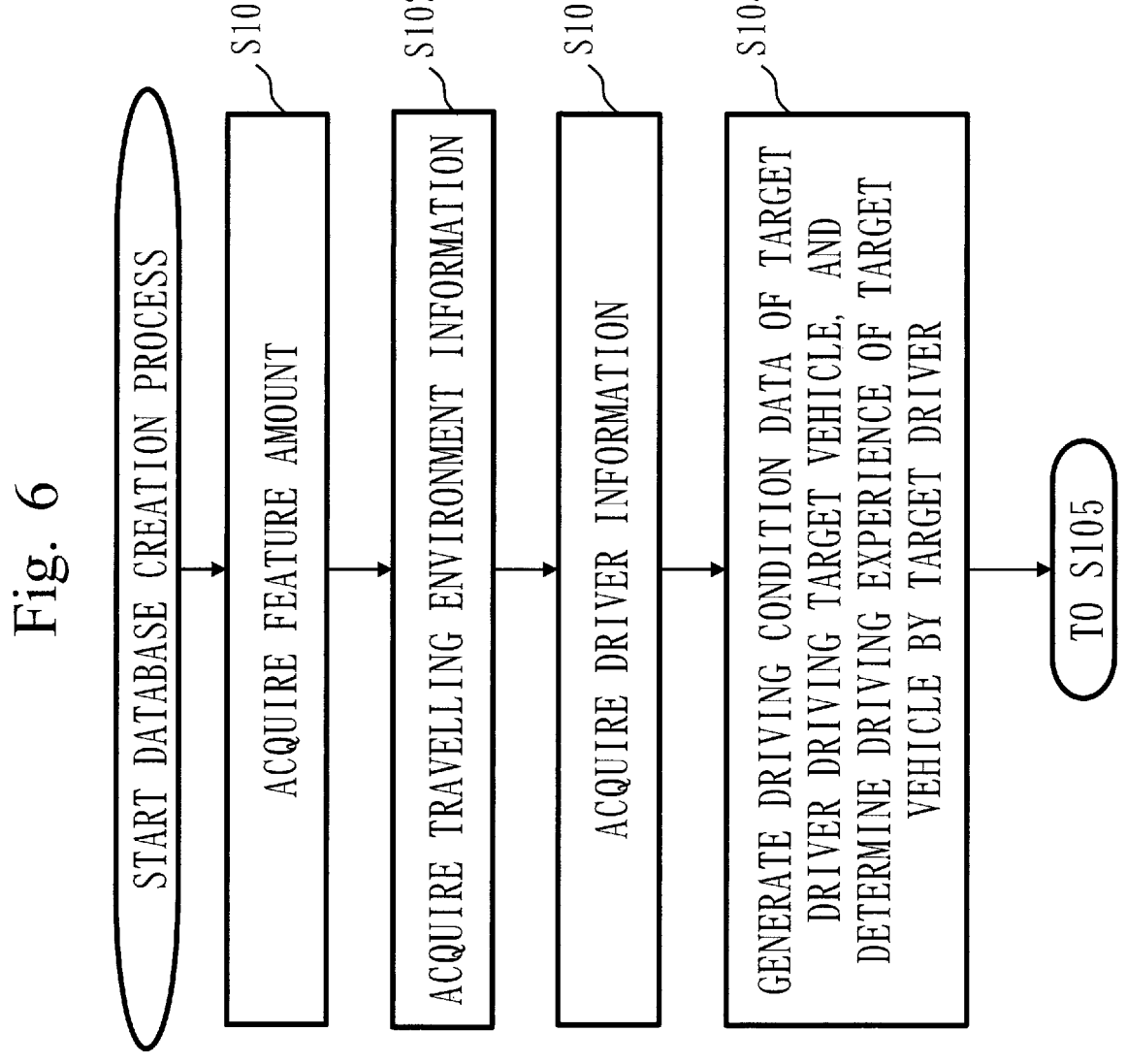
FIG. 6 is a flowchart illustrating an example of a processing procedure of a database creation unit according to the first embodiment.
Figure 7:
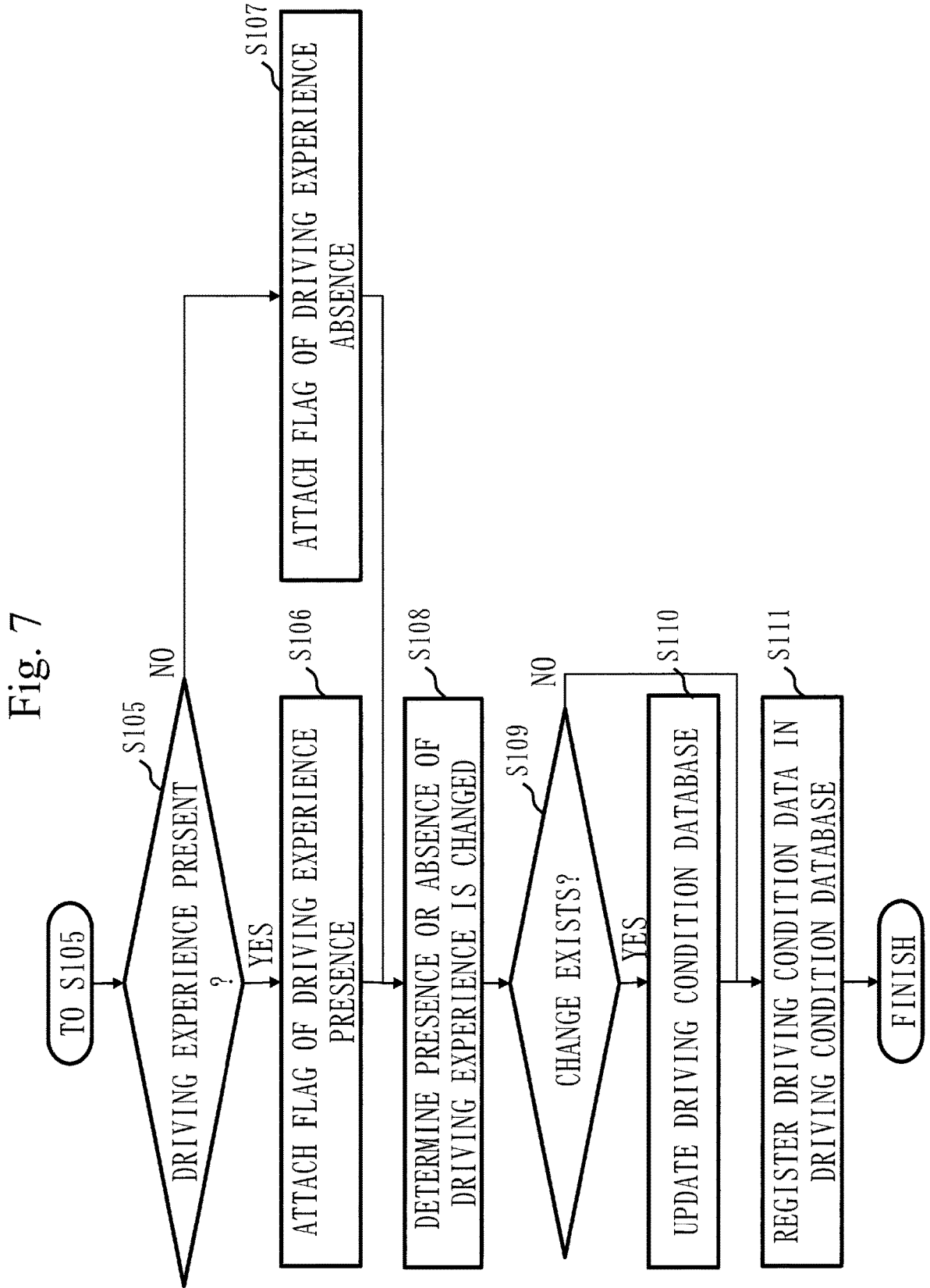
FIG. 7 is a flowchart illustrating an example of a processing procedure of the database creation unit according to the first embodiment.

FIG. 6 and FIG. 7 are flowcharts illustrating examples of a processing procedure of the database creation unit 154 according to the present embodiment.

In the description below, a driver to be estimated the driving characteristic shall be a target driver, and a vehicle presently driven by the target driver shall be a target vehicle. The target vehicle shall be the vehicle 100.

The database creation unit 154 determines whether the target driver has a driving experience of the target vehicle based on the driving condition database 160. Then, the database creation unit 154 refers to the driving condition database 160, and determines whether the driving experience of the target vehicle by the target driver has been changed. When it is determined to be changed, the database creation unit 154 updates the driving experience of the target vehicle by the target driver in the driving condition database 160.

Specifically as Follows.

In Step S101, the database creation unit 154 acquires a feature amount of driving operation of the target driver driving the vehicle 100 from the feature amount calculation unit 152.

In Step S102, the database creation unit 154 acquires travelling environment information of the vehicle 100 driven by the target driver from the travelling environment determination unit 153. The travelling environment information includes travelling spots and road environments.

In Step S103, the database creation unit 154 acquires driver information including an attribute of the target driver, vehicle type information of the vehicle 100 and indoor environment information, from the driver information acquisition unit 130.

The driver information shall include the indoor environment information of the vehicle 100 in addition to age, sex and driving history of the vehicle 100 of the driver of the vehicle 100, and the vehicle type information.

Next, the database creation unit 154 determines whether the target driver has the driving experience of the vehicle 100 by using driving condition data accumulated in the driving condition database 160. Further, the database creation unit 154 sets presence or absence of driving experience being a determination result in the driving condition data of the target driver driving the vehicle 100.
Specifically as Follows.

In Step S104, the database creation unit 154 generates driving condition data by the target driver driving the vehicle 100, by using the feature amount of driving operation, the travelling environment information and the driver information. An identifier of the target driver is attached to the driving condition data of the target driver driving the vehicle 100. In a case of a new driver, a new identifier is attached to associated information. Meanwhile, in a case of a driver who has been registered in the driving condition database 160, the database creation unit 154 attaches an existing identifier to associated information.

The database creation unit 154 extracts, from the driving condition data accumulated in the driving condition database 160, driving condition data corresponding to the target driver, whereof the driver information and the travelling environment information are common or similar to those of the driving condition data of the of the target driver driving the vehicle 100. In other words, the database creation unit 154 refers to driving condition data registered by the driver himself/herself, whereof the driver information and the travelling environment information are common or similar, from the driving condition data store in the driving condition database 160.

In Step S105, the database creation unit 154 determines whether a driver has a driving experience of the vehicle 100. For example, the database creation unit 154 determines whether the target driver has a driving experience of the vehicle 100 based on the number of pieces of driving condition data extracted. Specifically, the database creation unit 154 determines whether the number of pieces of driving condition data extracted is equal to or larger than the first threshold value, determines that the target driver has the driving experience of the vehicle 100 when the number is equal to or larger than the first threshold value, and determines that the target driver does not have the driving experience of the vehicle 100 when the number is not equal to nor larger than the first threshold value.

When it is determined that the driving experience is present, the procedure proceeds to Step S106. When it is determined that the driving experience is absent, the procedure proceeds to Step S107.

In Step S106, the database creation unit 154 attaches information meaning presence of driving experience to the driving condition data of the target driver driving the vehicle 100 generated in Step S104. For example, in a case of presence of experience, the database creation unit 154 attaches information indicating a value of 1 to a driving experience flag in the driving condition data of the target driver driving the vehicle 100.

In Step S107, the database creation unit 154 attaches information meaning absence of the driving experience to the driving condition data of the target driver driving the vehicle 100 generated in Step S104. For example, in a case of absence of experience, the database creation unit 154 attaches information indicating a value of 0 to the driving experience flag in the driving condition data of the target driver driving the vehicle 100.

Next, the database creation unit 154 determines whether the driving experience of the vehicle 100 by the target driver has been changed, and when it is determined to have been changed, updates the driving experience of the vehicle 100 by the target driver in the driving condition database 160. Specifically as Follows.

In Step S108, the database creation unit 154 compares the driving experience flag in the driving condition data of the target driver driving the vehicle 100 generated in Step S104 with the driving experience flag in the driving condition data of the target driver driving the vehicle 100 stored in the driving condition database 160. The database creation unit 154 determines whether presence or absence of the driving experience of the vehicle 100 by the target driver has been changed based on the comparison result. Specifically, the database creation unit 154 compares the driving experience flag in the data stored in the driving condition database 160, which is common or similar to data to be registered in the driving condition database 160 of data, with the driving experience flag in the data to be registered in the driving condition database 160.

In Step S109, the database creation unit 154 determines whether presence or absence of the driving experience of the vehicle 100 by the driver has been changed.

When it is determined that presence or absence of the driving experience has been changed, the procedure proceeds to Step S110. When it is determined that presence or absence of the driving experience has not been changed, the procedure proceeds to Step S111.

In Step S110, the database creation unit 154 updates information on presence or absence of the driving experience attached to the data stored in the driving condition database 160. For example, when it is changed to presence of the driving experience, the database creation unit 154 updates the value of 0 in the case of absence of experience to the value of 1 in the case of presence of experience. Further, when it is changed to absence of the driving experience, the database creation unit 154 updates the value of 1 in the case of presence of experience to the value of 0 in the case of absence of experience.

In Step S111, the database creation unit 154 accumulates driving condition data of the target driver driving the vehicle 100 in the driving condition database 160 after setting presence or absence of the driving experience in the driving condition data of the target driver driving the vehicle 100.

In the process above, driving condition data of the target driver driving the vehicle 100 at present is generated in step S104, and values are set to the driving experience flags of the driving condition data in Step S105 to Step S107.

However, driving condition data may not be generated in Step S104, and a determination result of driving experience may be set in a manner associated with the feature amount of the target driver in Step S105 to Step S107.

In that case, a process as follows is performed.

After updating the driving condition database 160 in Step S110, the database creation unit 154 makes the information acquired in Step S101, Step S102 and Step S103 correspond to be in the same tuple in the driving condition database 160, and generates driving condition data. For example, the database creation unit 154 makes the calculation result of the feature amount of driving operation, the determination result of the travelling spot and the road shape, and driver information correspond to be in the same tuple in the driving condition database 160.

Then, the database creation unit 154 assigns and attaches a unique identifier for each driver to information made to correspond in Step S111. For example, the database creation unit 154 compares the driver information acquired in Step S103 with the data stored in the driving condition database 160, and in a case of a new driver, attaches a new identifier to the driving condition data. Meanwhile, in a case of a driver registered in the driving condition database 160, the database creation unit 154 attaches an existing identifier to the driving condition data.

Then, in Step S111, the database creation unit 154 registers the driving condition data whereto an identifier is attached in the driving condition database 160.

FIG. 8 is a flowchart illustrating an example of a processing procedure of the driving characteristic estimation unit 155 according to the present embodiment.

The driving characteristic estimation unit 155 extracts from the driving condition database 160 driving condition data whereof the vehicle type information and the driving environment information included in the driver information are common or similar to those of the driving condition data of the target driver driving the vehicle 100. The driving characteristic estimation unit 155 estimates a driving characteristic of the target driver driving the vehicle 100 based on the driving condition data extracted.

The driving characteristic estimation unit 155 extracts from the driving condition database 160 driving condition data corresponding to the target driver, whereof the vehicle type information and the travelling environment information included in the driver information are common or similar to those of the driving condition data of the target driver driving the vehicle 100. The driving characteristic estimation unit 155 determines whether the number of pieces of driving condition data extracted is equal to or larger than the second threshold value 561, and when the number is equal to or larger than the second threshold value 561, generates a model to estimate a driving characteristic using the driving condition data extracted.

Meanwhile, when the number of pieces of driving condition data extracted is not equal to nor larger than the second threshold value 561, the driving characteristic estimation unit 155 extracts driving condition data corresponding to a driver other than the target driver, whereof the vehicle type information and the travelling environment information included in the driver information are common or similar to those of the driving condition data of the target driver driving the vehicle 100, and whereto information meaning presence of the driving experience of the vehicle 100 is attached by the database creation unit 154. Then, the driving characteristic estimation unit 155 generates a model to estimate a driving characteristic using the driving condition data extracted.

Specifically as Follows.

In Step S201, the driving characteristic estimation unit 155 acquires the feature amount of driving operation of the target driver driving the vehicle 100 from the feature amount calculation unit 152.

In Step S202, the driving characteristic estimation unit 155 acquires the travelling environment information of the vehicle 100 driven by the target driver from the travelling environment determination unit 153. The travelling environment information includes a travelling spot and a road environment.

In Step S203, the driving characteristic estimation unit 155 acquires the driver information including an attribute of the target driver, vehicle type information of the vehicle 100, and indoor environment information from the driver information acquisition unit 130.

As described above, the driver information includes indoor environment of the vehicle 100 in addition to age, sex and driving history of the vehicle 100 of the driver of the vehicle 100, and the vehicle type information.

In Step S204, the driving characteristic estimation unit 155 generates driving condition data by associating the information acquired in Step S201, Step S202 and Step S203, and generates driving condition data.

In Step S205 and Step S206, the driving characteristic estimation unit 155 determines whether the number of data corresponding to the vehicle presently driven by the driver of the vehicle 100 being a target of estimation is sufficient for model construction for estimation of a driving characteristic.

Specifically, the driving characteristic estimation unit 155 refers to common or similar data registered by a driver himself/herself stored in the driving condition database 160 using a determination result of travelling spots and road shapes, and driver information, as extraction conditions. In this case, whether the data is data of the driver himself/herself is determined using a unique identifier for each driver assigned by the database creation unit 154.

When the driving characteristic estimation unit 155 determines that the number of data is sufficient from the data referred to, the procedure proceeds to Step S208. Meanwhile, when it is determined that the number of data is not sufficient, the process proceeds to Step S207.

In Step S208, the driving characteristic estimation unit 155 refers to data of the driver himself/herself of the vehicle 100 from among the data stored in the driving condition database 160.

In Step S207, the driving characteristic estimation unit 155 refers to similar or common data registered by another driver from among the data stored in the driving condition database 160.

In Step S209, the driving characteristic estimation unit 155 constructs a driving characteristic estimation model of the vehicle that the driver is presently driving, using items of the feature amount in the data referred to in Step S205 to Step S208.

In Step S210, the driving characteristic estimation unit 155 estimates a driving characteristic by using as an input a calculation result of the feature amount of driving operation input from the feature amount calculation unit 152 with respect to the driving characteristic estimation model constructed in Step S209. The driving characteristic estimation unit 155 outputs an estimation result of the driving characteristic to the driving assistance unit 170.

*Other Configurations*

In the present embodiment, the functions of the system control unit 151, the feature amount calculation unit 152, the travelling environment determination unit 153, the database creation unit 154 and the driving characteristic estimation unit 155 are realized by software. As a variation, the functions of the system control unit 151, the feature amount calculation unit 152, the travelling environment determination unit 153, the database creation unit 154 and the driving characteristic estimation unit 155 may be realized by hardware components.

Specifically, the in-vehicle control device 150 includes an electronic circuit 909 instead of the processor 910.

Figure 9:
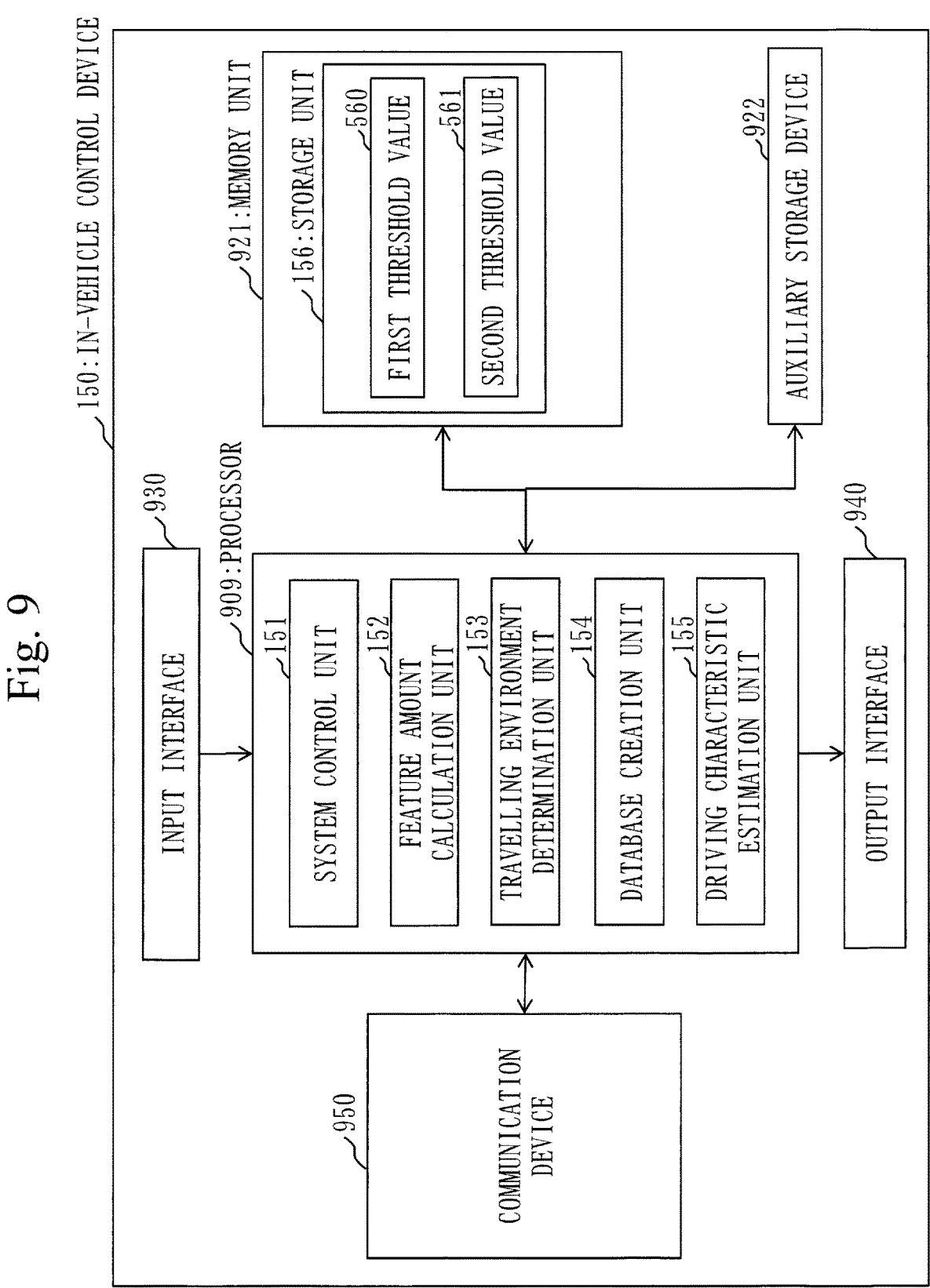
FIG. 9 is a diagram illustrating a configuration example of the in-vehicle control device according to a variation of the first embodiment.

FIG. 9 is a diagram illustrating a configuration example of the in-vehicle control device 150 according to a variation of the present embodiment.

The electronic circuit 909 is a dedicated electronic circuit to realize the functions of the system control unit 151, the feature amount calculation unit 152, the travelling environment determination unit 153, the database creation unit 154 and the driving characteristic estimation unit 155. The electronic circuit 909 is, for example, a single circuit, a composite circuit, a processor made into a program, a processor made into a parallel program, a logic IC, a GA, an ASIC or an FPGA. GA is an abbreviation for "Gate Array". ASIC is an abbreviation for "Application Specific Integrated Circuit". FPGA is an abbreviation for "Field Programmable Gate Array".

The functions of the system control unit 151, the feature amount calculation unit 152, the travelling environment determination unit 153, the database creation unit 154 and the driving characteristic estimation unit 155 may be realized by one electronic circuit, or may be realized by a plurality of electronic circuits dispersedly.

As another variation, a part of the functions of the system control unit 151, the feature amount calculation unit 152, the travelling environment determination unit 153, the database creation unit 154 and the driving characteristic estimation unit 155 may be realized by an electronic circuit, and the remaining functions may be realized by software. Further, a part or all the functions of the system control unit 151, the feature amount calculation unit 152, the travelling environment determination unit 153, the database creation unit 154 and the driving characteristic estimation unit 155 may be realized by firmware.

Each of the processor and electronic circuit is also called processing circuitry. That is, the functions of the system control unit 151, the feature amount calculation unit 152, the travelling environment determination unit 153, the database creation unit 154 and the driving characteristic estimation unit 155 are realized by processing circuitry.

DESCRIPTION OF EFFECT OF PRESENT EMBODIMENT

As described above, by the driving assistance system according to the present embodiment, it is possible to obtain an effect that suitable driving assistance corresponding to individual drivers can be provided even in a condition wherein a driver drives a vehicle of a type that the driver is inexperienced in driving, and a case wherein the driving experience of a driver has been changed.

Second Embodiment

In the present embodiment, description will be made mainly on points different from those in the first embodiment and points to be added to first embodiment.

In the present embodiment, components having functions similar to those in the first embodiment are denoted by the same reference signs, whereof description is omitted.
*Description of Configuration*

Figure 10:
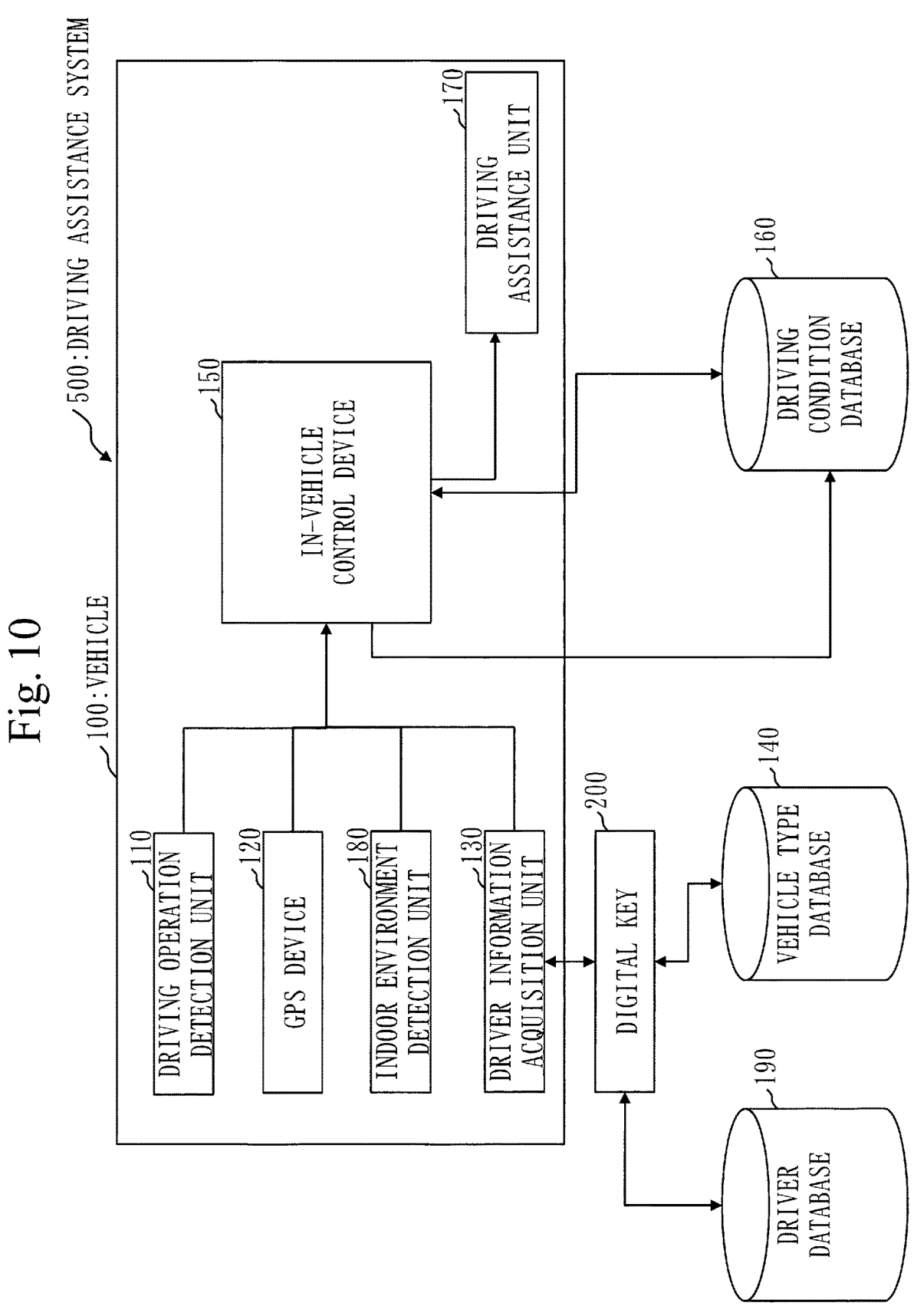
FIG. 10 is a diagram illustrating an example of an overall configuration of a driving assistance system according to a second embodiment.

FIG. 10 is a diagram illustrating an example of an overall configuration of the driving assistance system 500 according to a second embodiment.

In the present embodiment, the driver information acquisition unit 130 acquires data from the vehicle type database 140 and the driver database 190 via a digital key 200.

The functions of the other components are similar to those of the first embodiment.

The driver information acquisition unit 130 acquires age, sex and a driving history of the vehicle 100 of a driver of the vehicle 100, and vehicle type information when the vehicle 100 is started, and outputs them to the in-vehicle control device 150.

The driver information acquisition unit 130 acquires age, sex and the driving history of the vehicle 100 of the driver of the vehicle 100 from data stored in the driver database 190 provided outside the vehicle 100 via the digital key 200. The driver information acquisition unit 130 acquires information corresponding to the driver of the vehicle 100 from the data stored in the driver database 190 via the digital key 200.

Further, the driver information acquisition unit 130 acquires information corresponding to the vehicle 100 such as an operation method, a drive system, a category and a model stored in the vehicle type database 140 provided outside the vehicle 100 as vehicle type information, via the digital key 200.

The digital key 200 is a digital key of the vehicle 100 held by the driver. For the driver information acquisition unit 130 which operates at the time when the vehicle 100 is started, age, sex and a driving history of the vehicle 100 of the driver of the vehicle 100, and the vehicle type information are acquired and output from the vehicle type database 140 and the driver database 190. As an example of the digital key, in a case wherein the vehicle 100 is a vehicle rented through a car sharing service or a rental car service, a driver uses the vehicle 100 by using a device having a communication function such as a smartphone or a smartwatch, etc. as the digital key.

Description of Effect of Present Embodiment

As described above, as an application destination of the driving assistance system according to the present embodiment, a car sharing service or a rental car service can be considered. Especially, with the spread of car sharing service in future, it is assumed that occasions for a driver to use different vehicle types increase.

As described above, by the driving assistance system according to the present embodiment, the driver information acquisition unit 130 acquires driver information including information on a vehicle type to perform driving operation from a database via the digital key 200. As for the digital key 200, a device having a communication function being an apparatus such as a smartphone or a smartwatch of a service user, i.e., a driver becomes the digital key in a case wherein the vehicle 100 is a vehicle rented through a car sharing service or a rental car service.

In the first and second embodiments above, each unit of the driving assistance system is described as an independent functional block. However, the configuration of the driving assistance system may not be the configuration as described in the embodiments above. The functional block of the driving assistance system may have any configuration as long as it can realize the functions described in the embodiments above. Further, the driving assistance system may not be one device, but may be a system configured by a plurality of devices.

Furthermore, a plurality of parts of the first and second embodiments may be combined and performed. Otherwise, a part of these embodiments may be performed. In addition, these embodiments may be combined partially or as a whole, and performed in any manner of combination.

That is, in the first and second embodiments, it is possible to freely combine each embodiment, to deform an arbitrary component of each embodiment, or to omit an arbitrary component in each embodiment.

The embodiments as described above are essentially preferable examples, and are not intended for limiting the scope of the present disclosure, the range of application of the present disclosure, and the range of use of the present disclosure. It is possible to variously change the embodiments described above as needed.

REFERENCE SIGNS LIST

100: vehicle; 110: driving operation detection unit; 111: accelerator sensor; 112: brake sensor; 113: steering angle sensor; 114: inertial measurement device; 115: millimeter-wave radar; 116: in-vehicle camera; 120: GPS device; 130: driver information acquisition unit; 140: vehicle type database; 150: in-vehicle control device; 151: system control unit; 152: feature amount calculation unit; 153: travelling environment determination unit; 154: database creation unit; 155: driving characteristic estimation unit; 156: storage unit; 560: first threshold value; 561: second threshold value; 160: driving condition database; 170: driving assistance unit; 180: indoor environment detection unit; 190: driver database; 200: digital key; 500: driving assistance system; 909: electronic circuit; 910: processor; 921: memory unit; 922: auxiliary storage device; 930: input interface; 940: output interface; 950: communication device

The invention claimed is:

1. A driving assistance system comprising:
 a memory to store a driving condition database that stores records associated with a respective plurality of vehicle types, each record comprising a same plurality of entries of driving condition data, each of the plurality of entries of driving condition data comprising a correspondence between
  a driver identifier identifying a vehicle driver,
  at least one feature amount representing a feature of a driving operation by the vehicle driver identified by the corresponding driver identifier,
  a travelling environment comprised of the combination of an identified travelling spot and an identified road shape driven by the vehicle driver identified by the corresponding driver identifier, and
  driver information including an attribute of the vehicle driver identified by the corresponding driver identifier,
 each record of the driving condition database including driving experience flags for the respective plurality of entries of driving condition data, each driving experience flag indicating the presence or absence in the corresponding vehicle driver of driving experience with respect to the corresponding travelling environment and the associated vehicle type; and
 processing circuitry
  to estimate a driving characteristic of a vehicle driver who is presently driving based on the driving condition database; and
  to determine the presence or absence of driving experience in the target vehicle driver with respect to the corresponding travelling environment and the target vehicle based on the driving condition database, by referring to
   the record of the driving condition database associated with the vehicle type of the target vehicle, and
   the entries in the referred-to record that correspond to the driver identifier or the driver information of the target vehicle driver himself/herself whose corresponding travelling environment is common or similar to a present travelling environment in which the target vehicle is presently being driven, wherein the driver of whom the driving characteristic is to be estimated is regarded as the target vehicle driver, and the vehicle presently being driven by the target vehicle is regarded as the target vehicle,
  to determine based on the referred-to entries whether the driving experience flags of the referred-to entries should be changed based on the present driving of the target vehicle by the target vehicle driver, and when it is determined that the driving experience flags should be changed, to update the driving experience flags of the referred-to entries in the driving condition database.

2. The driving assistance system as defined in claim 1, wherein the processing circuitry acquires the feature amount of the target vehicle driver, the travelling environment in which the target vehicle is presently being driven by the target vehicle driver, and the driver information including the attribute of the target vehicle driver and the vehicle type information of the target vehicle, generates driving condition data of the target vehicle driver driving the target vehicle, determines whether the driving experience flag of the referred-to record of the driving condition database should be changed, and sets the driving experience flag based on the determination result.

3. The driving assistance system as defined in claim 2, wherein the processing circuitry extracts driving condition data accumulated in the referred-to entries in the driving condition database, and determines whether to change the driving experience flag in the referred-to entries based on the number of pieces of the driving condition data extracted.

4. The driving assistance system as defined in claim 3, wherein the processing circuitry accumulates additional driving condition data of the target driver driving the target vehicle in the driving condition database after determining whether to change the driving experience flags in the referred-to entries of the driving condition database.

5. The driving assistance system as defined in claim 1, wherein the processing circuitry extracts the at least one feature amount from each of the referred-to entries in the driving condition database, and estimates a driving characteristic of the target driver driving the target vehicle based on extracted feature amounts.

6. The driving assistance system as defined in claim 5, wherein the processing circuitry determines whether the number of extracted feature amounts is equal to or larger than a threshold value, and when the number is equal to or larger than the threshold value, generates a model to estimate the driving characteristic using the extracted feature amounts.

7. The driving assistance system as defined in claim 6, wherein, when the number of extracted feature amounts is not equal to nor larger than the second threshold value, the processing circuitry
 extracts feature amounts from one or more other entries in the referred-to record of the driving condition database, which correspond to vehicle drivers other than the target vehicle driver, and which have a travelling environment common or similar to the present traveling environment in which the target vehicle is being driven by the target vehicle driver driving the target vehicle, wherein each driving experience flag in the one or more other entries indicate the presence of driving experience of the vehicle type associated with the target vehicle is attached, and
 generates a model to estimate the driving characteristic using the feature amounts extracted from the one or more other entries.

8. The driving assistance system as defined in claim 1, wherein the driver information includes indoor environment information representing a setting state inside the vehicle by the driver.

9. An in-vehicle control device comprising:
 processing circuitry
  to accumulate driving condition data in a driving condition database that stores records associated with a respective plurality of vehicle types, each record comprising a same plurality of entries of driving condition data, each of the plurality of entries of driving condition data comprising a correspondence between a driver identifier identifying a vehicle driver, at least one feature amount representing a feature of a driving operation by the driver identified by the corresponding driver identifier, a travelling environment comprised of the combination of an identified travelling spot and an identified road shape driven by the vehicle driver identified by the corresponding driver identifier, and travels, driver information including an attribute of the vehicle driver identified by the corresponding vehicle driver identifier, each record of the driving condition including driving experience flags for the respective plurality of entries of driving condition data, each driving experience flag indicating presence or absence in the corresponding vehicle driver of driving experience with respect to the corresponding travelling environment and the associated vehicle type;

to estimate a driving characteristic of a vehicle driver who is presently driving based on the driving condition database, wherein the processing circuitry determines the presence or absence of driving experience in the target vehicle driver with respect to the corresponding travelling environment and the target vehicle based on the driving condition database, by referring to the record of the driving condition database associated with the vehicle type of the target vehicle, and the entries in the referred-to record that correspond to the driver identifier or the driver information of the target vehicle driver himself/herself whose corresponding, travelling environment is common or similar to a present travelling environment in which the target vehicle is presently being driven, wherein the driver of whom the driving characteristic is to be estimated is regarded as the target driver, and a vehicle presently being driven by the target vehicle driver is regarded as the target vehicle, wherein the processing circuitry determines based on the referred-to entries whether the driving experience flags of the referred-to entries should be changed based on the present driving of the target vehicle by the target vehicle driving, and when it is determined that the driving experience flags should be changed, updates the driving experience flags of the referred-to entries in the driving condition database.

10. A driving assistance method used in an in-vehicle control device that is provided in a vehicle, the driving assistance method comprising:

accumulating driving condition data in a driving condition database that stores records associated with a respective plurality of vehicle types, each record comprising a same plurality of entries of driving condition data, each of the plurality of entries of driving condition data comprising a correspondence between a driver identifier identifying a vehicle driver, at least one feature amount representing a feature of a driving operation by the driver identified by the corresponding driver identifier, a travelling environment comprised of the combination of an identified travelling spot and an identified road shape driven by the vehicle driver identified by the corresponding driver identifier, driver information including an attribute of the vehicle driver identified by the corresponding vehicle driver identifier, each record of the driving condition including driving experience flags for the respective plurality of entries of driving condition data, each driving experience flag indicating presence or absence of driving experience with respect to the corresponding travelling environment and the associated vehicle type;

estimating a driving characteristic of a vehicle driver who is presently driving based on the driving condition database, determining the presence or absence of driving experience in the target vehicle driver with respect to the corresponding travelling environment and the target vehicle based on the driving condition database, by referring to the record of the driving condition database associated with the vehicle type of the target vehicle, and the entries in the referred-to record that correspond to the driver identifier or the driver information of the target vehicle driver himself/herself whose corresponding, travelling environment is common or similar to a present travelling environment in which the target vehicle is presently being driver, wherein the driver of whom the driving characteristic is to be estimated is regarded as the target driver, and a vehicle presently being driven by the target vehicle driver is regarded as the target vehicle, wherein the method determines based on the referred-to entries whether the driving experience flags of the referred-to entries should be changed based on the present driving of the target vehicle by the target vehicle driving, and when it is determined that the driving experience flags should be changed, updates the driving experience flags of the referred-to entries in the driving condition database.

11. A non-transitory computer readable medium storing a driving assistance program used in an in-vehicle control device that is provided in a vehicle, the driving assistance program to make a computer perform:

a database creation process to accumulate driving condition data in a driving condition database that stores records associated with a respective plurality of vehicle types, each record comprising a same plurality of entries of driving condition data, each of the plurality of entries of driving condition data comprising a correspondence between a driver identifier identifying a vehicle driver, at least one feature amount representing a feature of a driving operation by the driver identified by the corresponding driver identifier, a travelling environment comprised of the combination of an identified travelling spot and an identified road shape driven by the vehicle driver identified by the corresponding driver identifier, and driver information including an attribute of the vehicle driver identified by the corresponding vehicle driver identifier, each record of the driving condition including driving experience flags for the respective plurality of entries of driving condition data, each driving experience flag indicating presence or absence of driving experience with respect to the corresponding travelling environment and of the associated vehicle type;

a driving characteristic estimation process to estimate a driving characteristic of a vehicle driver who is presently driving based on the driving condition database, wherein the database creation process determines the presence or absence of driving experience in the target vehicle driver with respect to the corresponding travelling environment and the target vehicle based on the driving condition database, by referring to the record of the driving condition database associated with the vehicle type of the target vehicle, and the entries in the referred-to record that correspond to the driver identifier or the driver information of the target vehicle driver himself/herself whose corresponding travelling environment is common or similar to a present travelling environment in which the target vehicle is presently being driver, wherein the driver of whom the driving characteristic is to be estimated is regarded as the target driver, and a vehicle presently being driven by the target vehicle driver regarded as the target vehicle, wherein the computer determines based on the referred-to entries whether the driving experience flags of the referred-to entries should be changed based on the present driving of the target vehicle by the target vehicle driving, and when it is determined that the driving experience flags should be changed, updates the driving experience flags of the referred-to entries in the driving condition database.

\*    \*    \*    \*    \*